(12) United States Patent
Kim et al.

(10) Patent No.: US 9,382,457 B2
(45) Date of Patent: Jul. 5, 2016

(54) ADHESIVE FILM, ADHESIVE COMPOSITION FOR THE SAME, AND OPTICAL MEMBER INCLUDING THE SAME

(71) Applicants: Lee June Kim, Uiwang-si (KR); Ik Hwan Cho, Uiwang-si (KR); Ki Yong Kim, Uiwang-si (KR); Sung Hyun Mun, Uiwang-si (KR); In Cheon Han, Uiwang-si (KR)

(72) Inventors: Lee June Kim, Uiwang-si (KR); Ik Hwan Cho, Uiwang-si (KR); Ki Yong Kim, Uiwang-si (KR); Sung Hyun Mun, Uiwang-si (KR); In Cheon Han, Uiwang-si (KR)

(73) Assignee: CHEIL INDUSTRIES, INC., Gumi-si, Kyeongsangbuk-do (KR)

( * ) Notice: Subject to any disclaimer, the term of this patent is extended or adjusted under 35 U.S.C. 154(b) by 171 days.

(21) Appl. No.: 13/927,201

(22) Filed: Jun. 26, 2013

(65) Prior Publication Data

US 2013/0345333 A1    Dec. 26, 2013

(30) Foreign Application Priority Data

Jun. 26, 2012  (KR) .................. 10-2012-0068527

(51) Int. Cl.
| | | |
|---|---|---|
| *C08F 2/50* | (2006.01) | |
| *C08F 2/46* | (2006.01) | |
| *C08G 61/04* | (2006.01) | |
| *C09J 133/14* | (2006.01) | |
| *C08F 20/10* | (2006.01) | |
| *C08F 20/20* | (2006.01) | |
| *C08F 20/36* | (2006.01) | |
| *C08F 22/10* | (2006.01) | |
| *C09J 4/00* | (2006.01) | |

(52) U.S. Cl.
CPC .............. *C09J 133/14* (2013.01); *C08F 20/10* (2013.01); *C08F 20/20* (2013.01); *C08F 20/36* (2013.01); *C08F 22/105* (2013.01); *C09J 4/00* (2013.01)

(58) Field of Classification Search
CPC ......... C09J 133/14; C09J 4/00; C08F 22/105
USPC ................... 522/33, 6, 71, 189, 184, 1; 520/1
See application file for complete search history.

(56) References Cited

U.S. PATENT DOCUMENTS

| | | | | |
|---|---|---|---|---|
| 3,716,571 | A | * | 2/1973 | Berlin et al. ................. 558/267 |
| 4,599,262 | A | * | 7/1986 | Schulte et al. ............... 428/215 |
| 2005/0250870 | A1 | * | 11/2005 | Jallouli ........................ 522/182 |
| 2012/0037410 | A1 | | 2/2012 | Amou et al. |

FOREIGN PATENT DOCUMENTS

| | | | |
|---|---|---|---|
| CN | 101952334 A | | 1/2011 |
| EP | 2-226-342 A1 | | 9/2010 |
| JP | 2001-163937 | * | 6/2001 |
| JP | 2002-180040 | * | 6/2002 |
| JP | 2008-208281 | * | 9/2008 |
| JP | 2012-041456 A | | 3/2012 |
| WO | WO-2005-105942 A1 | | 11/2005 |

OTHER PUBLICATIONS

Nakayama et al, Jun. 19, 2001, JP 2001-163937 Machine Translation.*
Takematsu et al, Jun. 26, 2002, JP 2002-180040 Machine Translation.*
Oya et al, Sep. 11, 2008, JP 2008-208281 Machine Translation.*
European Search Report mailed Dec. 9, 2013 in European Patent Application No. 13173620.9.
Office Action dated Jul. 29, 2014 in corresponding Chinese Patent Application No. 201310258538.8.

* cited by examiner

*Primary Examiner* — Ling Choi
*Assistant Examiner* — Jessica E Whiteley
(74) *Attorney, Agent, or Firm* — Lee & Morse, P.C.

(57) ABSTRACT

An adhesive film, an adhesive composition for the same, and an optical member including the same, the adhesive film having an index of refraction of about 1.48 or more and a dielectric constant variation of about 30% or less, as expressed by Equation 1:

$$\text{Dielectric constant variation (\%)} = \frac{(A - B)}{A} \times 100, \quad \text{[Equation 1]}$$

wherein A is the dielectric constant of the adhesive film measured at a frequency of $10^3$ Hz, and B is the dielectric constant of the adhesive film measured at a frequency of $10^6$ Hz, and/or the adhesive film including a (meth) acrylate copolymer having carbonate groups and an aromatic groups.

20 Claims, 1 Drawing Sheet

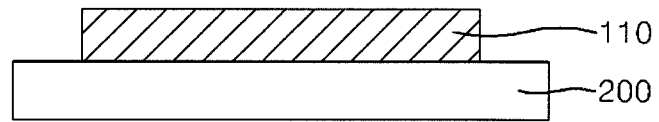

ADHESIVE FILM, ADHESIVE COMPOSITION FOR THE SAME, AND OPTICAL MEMBER INCLUDING THE SAME

CROSS-REFERENCE TO RELATED APPLICATION

Korean Patent Application No. 10-2012-0068527, filed on Jun. 26, 2012, in the Korean Intellectual Property Office, and entitled: "Adhesive Film, Adhesive Composition For the Same and Optical Member Including the Same," is incorporated by reference herein in its entirety.

BACKGROUND

1. Field

Embodiments relate to an adhesive film, an adhesive composition for the same, and an optical member including the same.

2. Description of the Related Art

A capacitive touchpad may be bonded to a window or film via a transparent adhesive. The capacitive touchpad may detect variation in capacitance of the window or the film. As human hands or predetermined materials (e.g., conductors or liquids) may be in proximity with or contact a unipolar detecting plate, dielectric constant of the unipolar detecting plate may be varied. In accordance with such dielectric constant variation of the unipolar detecting plate, capacitance may be varied to generate a switching signal.

SUMMARY

Embodiments are directed to an adhesive film, an adhesive composition for the same, and an optical member including the same.

The embodiments may be realized by providing an adhesive film having an index of refraction of about 1.48 or more and a dielectric constant variation of about 30% or less, as expressed by Equation 1:

$$\text{Dielectric constant variation (\%)} = \frac{(A-B)}{A} \times 100, \quad \text{[Equation 1]}$$

wherein A is the dielectric constant of the adhesive film measured at a frequency of $10^3$ Hz, and B is the dielectric constant of the adhesive film measured at a frequency of $10^6$ Hz.

The adhesive film may include a (meth)acrylate copolymer having carbonate groups and aromatic groups, a photocurable monomer, an initiator, and a crosslinking agent.

The adhesive film may be formed of a composition including about 1 wt % to about 65 wt % of the (meth)acrylate copolymer, about 15 wt % to about 90 wt % of the photocurable monomer, about 0.1 wt % to about 10 wt % of the initiator, and about 0.01 wt % to about 10 wt % of the crosslinking agent.

The (meth)acrylate copolymer may be represented by Formula 1:

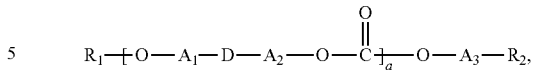

[Formula 1]

wherein $R_1$ is hydrogen, a substituted or unsubstituted $C_1$-$C_3$ alkyl group, or a group represented by Formula 2 or 3:

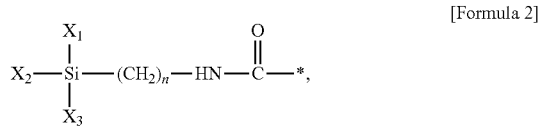

[Formula 2]

wherein * represents a linking group for —O— in Formula 1, $X_1$, $X_2$ and $X_3$ are the same or different and each independently are a substituted or unsubstituted $C_1$-$C_{10}$ alkyl group, a substituted or unsubstituted $C_1$-$C_{10}$ alkoxy group, or a substituted or unsubstituted $C_6$-$C_{20}$ aryl group, and n is an integer from 1 to 10,

[Formula 3]

wherein * represents a linking group for —O— in Formula 1, and $R_3$ is hydrogen or a substituted or unsubstituted $C_1$-$C_3$ alkyl group; $A_1$ and $A_2$ are the same or different, and each independently are a substituted or unsubstituted $C_6$-$C_{20}$ aromatic hydrocarbon group; D is a single bond, or a substituted or unsubstituted $C_1$-$C_{10}$ alkylene group; $A_3$ is a single bond, —CO—$(CH_2)_m$— or —CONH—$(CH_2)_p$—, wherein m is an integer from 1 to 10 and p is an integer from 1 to 10; $R_2$ is a group represented by Formula 4:

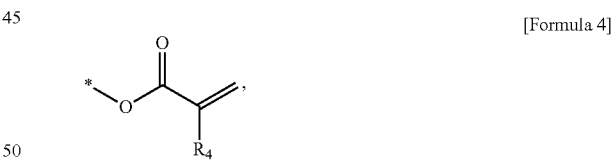

[Formula 4]

wherein * represents a linking group for $A_3$, and $R_4$ is hydrogen or a substituted or unsubstituted $C_1$-$C_3$ alkyl group; and a is an integer from 1 to 250.

The embodiments may also be realized by providing an adhesive film having an average dielectric constant of about 3.0 or less at a frequency of $10^3$ Hz to $10^6$ Hz and a resistance variation ($\Delta R$) of about 2% or less, as expressed by Equations 2 and 3, respectively:

$$\text{Average Dielectric constant} = \frac{(E_{max} + E_{min})}{2}, \quad \text{[Equation 2]}$$

wherein $E_{max}$ is a maximum dielectric constant of the adhesive film measured at a frequency of $10^3$ Hz to $10^6$ Hz, and $E_{min}$ is a minimum dielectric constant of the adhesive film measured at a frequency of $10^3$ Hz to $10^6$ Hz, $$\Delta R = \frac{P_2 - P_1}{P_1} \times 100, \quad \text{[Equation 3]}$$

wherein $P_1$ is an initial resistance (unit:Ω) measured on a sample with electrodes formed at both ends of the adhesive film, and $P_2$ is resistance (unit:Ω) of the sample after storage at 60° C./90% RH for 240 hours.

The adhesive film may include a (meth)acrylate copolymer having carbonate groups and aromatic groups, a photocurable monomer, an initiator, and a crosslinking agent.

The adhesive film may be formed of a composition including about 1 wt % to about 65 wt % of the (meth)acrylate copolymer, about 15 wt % to about 90 wt % of the photocurable monomer, about 0.1 wt % to about 10 wt % of the initiator, and about 0.01 wt % to about 10 wt % of the crosslinking agent.

The (meth)acrylate copolymer may be represented by Formula 1:

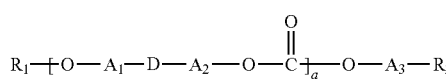

[Formula 1]

wherein $R_1$ is hydrogen, a substituted or unsubstituted $C_1$-$C_3$ alkyl group, or a group represented by Formula 2 or 3:

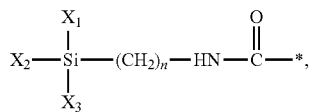

[Formula 2]

wherein * represents a linking group for —O— in Formula 1, $X_1$, $X_2$ and $X_3$ are the same or different and each independently are a substituted or unsubstituted $C_1$-$C_{10}$ alkyl group, a substituted or unsubstituted alkoxy group, or a substituted or unsubstituted $C_6$-$C_{20}$ aryl group, and n is an integer from 1 to 10,

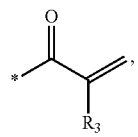

[Formula 3]

wherein * represents a linking group for —O— in Formula 1, and $R_3$ is hydrogen or a substituted or unsubstituted $C_1$-$C_3$ alkyl group; $A_1$ and $A_2$ are the same or different, and each independently are a substituted or unsubstituted $C_6$-$C_{20}$ aromatic hydrocarbon group; D is a single bond, or a substituted or unsubstituted $C_1$-$C_{10}$ alkylene group;

$A_3$ is a single bond, —CO—(CH$_2$)$_m$— or —CONH—(CH$_2$)$_p$—, wherein m is an integer from 1 to 10 and p is an integer from 1 to 10; $R_2$ is a group represented by Formula 4:

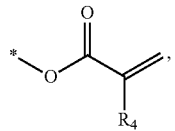

[Formula 4]

wherein * represents a linking group for $A_3$, and $R_4$ is hydrogen or a substituted or unsubstituted $C_1$-$C_3$ alkyl group; and a is an integer from 1 to 250.

The embodiments may also be realized by providing an adhesive composition comprising a (meth)acrylate copolymer having carbonate groups and aromatic groups.

The (meth)acrylate copolymer may have a dielectric constant of about 3.0 or less at a frequency of $10^3$ Hz to $10^6$ Hz and an index of refraction of about 1.50 to about 1.60.

The (meth)acrylate copolymer may have a weight average molecular weight of about 5,000 g/mol to about 100,000 g/mol.

The (meth)acrylate copolymer may be represented by Formula 1:

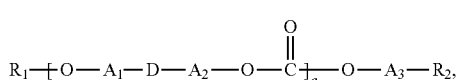

[Formula 1]

wherein $R_1$ is hydrogen, a substituted or unsubstituted $C_1$-$C_3$ alkyl group, or a group represented by Formula 2 or 3:

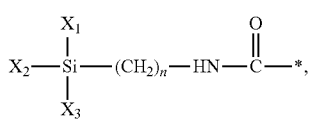

[Formula 2]

wherein * represents a linking group for —O— in Formula 1, $X_1$, $X_2$ and $X_3$ are the same or different and each independently are a substituted or unsubstituted $C_1$-$C_{10}$ alkyl group, a substituted or unsubstituted $C_1$-$C_{10}$ alkoxy group, a substituted or unsubstituted $C_6$-$C_{20}$ aryl group, and n is an integer from 1 to 10,

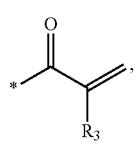

[Formula 3]

wherein * represents a linking group for —O— in Formula 1, and $R_3$ is hydrogen or a substituted or unsubstituted $C_1$-$C_3$ alkyl group; $A_1$ and $A_2$ are the same or different, and each independently are a substituted or unsubstituted $C_6$-$C_{20}$ aromatic hydrocarbon group; D is a single bond, or a substituted or unsubstituted $C_1$-$C_{10}$ alkylene group; $A_3$ is a single bond, —CO—(CH$_2$)$_m$— or —CONH—(CH$_2$)$_p$—, wherein m is an integer from 1 to 10 and p is an integer from 1 to 10; $R_2$ is a group represented by Formula 4:

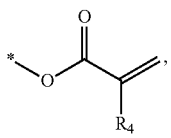

[Formula 4]

wherein * represents a linking group for $A_3$, and $R_4$ is hydrogen or a substituted or unsubstituted $C_1$-$C_3$ alkyl group; and a is an integer from 1 to 250.

The adhesive composition may further include a photocurable monomer, an initiator, and a crosslinking agent.

The composition may include about 1 wt % to about 65 wt % of the (meth)acrylate copolymer, about 15 wt % to about 90 wt % of the photocurable monomer, about 0.1 wt % to about 10 wt % of the initiator, and about 0.01 wt % to about 10 wt % of the crosslinking agent.

The photocurable monomer may include a vinyl monomer-containing alkyl group, a vinyl monomer-containing alicyclic group, a vinyl monomer-containing hydroxyl group, and a (meth)acrylic monomer-containing hetero-alicyclic group.

The vinyl monomer-containing alkyl group may be present in an amount of about 1 wt % to about 75 wt %, the vinyl monomer-containing hydroxyl group may be present in an amount of about 1 wt % to about 10 wt %, the vinyl monomer-containing alicyclic group may be present in an amount of about 5 wt % to about 20 wt %, and the (meth)acrylic monomer-containing hetero-alicyclic group may be present in an amount of about 1 wt % to about 10 wt %, in the adhesive composition.

The adhesive composition may further include a silane coupling agent.

The adhesive composition may further include a curing accelerator, an ionic liquid, a lithium salt, an inorganic filler, a softener, an antioxidant, an anti-aging agent, a stabilizer, a tackifier resin, a reforming resin, a leveling agent, an anti-foaming agent, a plasticizer, a dye, a pigment, a UV blocking agent, a fluorescent whitening agent, a dispersant, a heat stabilizer, a light stabilizer, a UV absorber, an anti-static agents, a lubricant, or a solvent.

The embodiments may also be realized by providing an optical member including the adhesive film according to an embodiment.

BRIEF DESCRIPTION OF DRAWING

Features will become apparent to those of skill in the art by describing in detail exemplary embodiments with reference to the attached drawing in which:

FIG. 1 illustrates a sectional view of an optical member according to an embodiment.

DETAILED DESCRIPTION

Example embodiments will now be described more fully hereinafter with reference to the accompanying drawing; however, they may be embodied in different forms and should not be construed as limited to the embodiments set forth herein. Rather, these embodiments are provided so that this disclosure will be thorough and complete, and will fully convey exemplary implementations to those skilled in the art.

In an embodiment, an adhesive composition may include a (meth)acrylate copolymer having carbonate groups and aromatic groups.

As used herein, the term "substituted" in "substituted or unsubstituted" may mean that a hydrogen atom is substituted with a $C_1$-$C_{10}$ alkyl group, a $C_3$-$C_{10}$ cycloalkyl group, a $C_6$-$C_{20}$ aryl group, a halogen, a hydroxyl group, or a $C_1$-$C_{10}$ alkoxy group.

As used herein, the term "(meth)acrylate" may refer to an unsubstituted acrylate group, a methyl substituted acrylate group, or a higher alkyl substituted acrylate group, e.g., an ethyl acrylate, a propyl acrylate, etc.

(Meth)Acrylate Copolymer Having Carbonate Groups and an Aromatic Groups

The copolymer may serve as a binder for an adhesive film. The copolymer may be cured together with photocurable monomers, and may form a matrix of an adhesive film when the adhesive film is prepared from the adhesive composition.

As noted above, the copolymer may include both an aromatic group and a carbonate group. The carbonate group may be, e.g., (—O—C(=O)—O—). The copolymer may have an index of refraction of about 1.50 to about 1.60. The copolymer may help improve outdoor visibility of the adhesive film due to very high index of refraction, which may be very similar to that of materials to which the adhesive film formed of the adhesive composition will be attached, e.g., an ITO film of a touch panel.

The copolymer may have a dielectric constant of about 3.0 or less, e.g., from about 2.0 to about 3.0, at a frequency of $10^3$ Hz to $10^6$ Hz. The copolymer may have a low dielectric constant by being prepared from a carbonate polyol having a low dielectric constant. As a result, an adhesive film prepared from an adhesive composition containing the copolymer may have a lower dielectric constant than other adhesive films (e.g., a touch film). As a result, capacitance upon touch of the adhesive film may be reduced and signal delay may be reduced and/or prevented, thereby enhancing sensitivity.

The copolymer may have a weight average molecular weight from about 5,000 g/mol to about 100,000 g/mol. Within this range, the copolymer may function effectively as an adhesive resin.

The copolymer may have a glass transition temperature (Tg) from about −80° C. to about 0° C. Within this range, the copolymer may function as an effective adhesive resin.

The copolymer may include an aromatic group, a carbonate group, and a (meth)acrylate group.

In an implementation, the copolymer may be represented by Formula 1, below

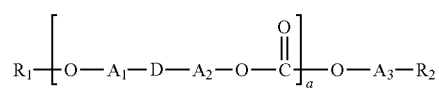

[Formula 1]

In Formula 1, $R_1$ may be hydrogen, a substituted or unsubstituted $C_1$-$C_3$ alkyl group, or a group represented by Formula 2 or 3, below

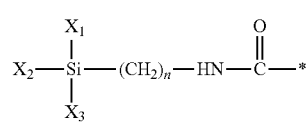

[Formula 2]

In Formula 2, * may represent a linking group to —O— in Formula 1, $X_1$, $X_2$ and $X_3$ may each independently be a substituted or unsubstituted $C_1$-$C_{10}$ alkyl group, a substituted or unsubstituted $C_1$-$C_{10}$ alkoxy group, or a substituted or unsubstituted $C_6$-$C_{20}$ aryl group, and n may be an integer from 1 to 10.

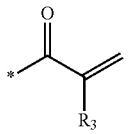

[Formula 3]

In Formula 3, * may represent a linking group to —O— in Formula 1, and $R_3$ may be hydrogen or a substituted or unsubstituted $C_1$-$C_3$ alkyl group.

$A_1$ and $A_2$ may each independently be a substituted or unsubstituted $C_6$-$C_{20}$ aromatic hydrocarbon group.

D may be a single bond, or a substituted or unsubstituted $C_1$-$C_{10}$ alkylene group.

$A_3$ may be a single bond, —CO—$(CH_2)_m$—, or —CONH—$(CH_2)_p$—, wherein m may be an integer from 1 to 10 and p may be an integer from 1 to 10.

$R_2$ may be a group represented by Formula 4, below.

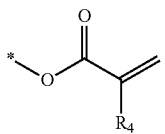

[Formula 4]

In Formula 4, * may represent a linking group to $A_3$, and $R_4$ may be hydrogen or a substituted or unsubstituted $C_1$-$C_3$ alkyl group.

a may be an integer from 1 to 250.

In the above, the "alkylene group" may be linear or branched.

In the above, '$(CH_2)_n$', '$(CH_2)_m$' or '$(CH_2)_p$' may be linear or branched.

In an implementation, $X_1$, $X_2$, and $X_3$ may each independently be a substituted or unsubstituted $C_1$-$C_5$ alkoxy group.

In an implementation, a may be an integer from 1 to 100, e.g., an integer from 1 to 50 or an integer from 1 to 10.

In an implementation, $A_1$ and $A_2$ may each independently be a substituted or unsubstituted $C_6$-$C_{20}$ arylene group, e.g., a substituted or unsubstituted $C_6$-$C_{10}$ arylene group.

In an implementation, D may be a single bond or a substituted or unsubstituted linear or branched $C_1$-$C_5$ alkylene group.

The copolymer may be a non-halogen copolymer. For example, the copolymer may not include a halogen such as fluorine, chlorine, iodine, or bromine. As a result, the copolymer may be environmentally friendly and may help reduce and/or prevent corrosion of electronic devices.

The copolymer may be prepared by a suitable method. For example, the copolymer may be prepared by reacting a polyol (containing an aromatic group and a carbonate group) with a compound containing a (meth)acrylate group.

The polyol containing an aromatic group and a carbonate group may include suitable polyol that has a low dielectric constant of, e.g., about 3.0 or less at 1,000 Hz, and an index of refraction of about 1.50 or less due to the presence of at least one aromatic group. For example, the polyol may be a polycarbonate diol including units represented by Formula 5, below.

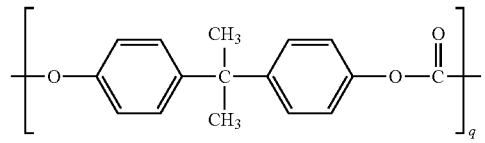

[Formula 5]

In Formula 5, q may be an integer from 1 to 250.

The compound containing a (meth)acrylate group may include a suitable compound that includes a (meth)acrylate group and a functional group (e.g., isocyanate group) capable of reacting with the polyol. For example, the (meth)acrylate group-containing compound may be (meth)acryloyloxyalkyl isocyanate.

The copolymer may be prepared by polymerizing the polyol containing an aromatic group and a carbonate group with the compound containing a (meth)acrylate group at 30° C. to 60° C. for about 30 seconds to about 24 hours. The polymerization may be performed by, e.g., mass polymerization, emulsion polymerization, suspension polymerization, and the like.

The polymerization may be performed in the absence of a catalyst or in the presence of a catalyst. The catalyst may be, e.g., at least one selected from the group of dibutyltin dilaurate (DBTDL), triethylene diamine (TEDA), and 1,4-diazabicyclo[2.2.2]octane, without being limited thereto. In an implementation, the catalyst may be used in an amount of about 0.05 parts by weight to about 2 parts by weight based on 100 parts by weight of the polyol.

In addition, the copolymer may be prepared by polymerizing the polyol containing an aromatic group and a carbonate group, the compound containing a (meth)acrylate group, and a compound containing a silane group.

The compound containing a silane group may include a suitable compound that includes a silane group (—$SiX_1X_2X_3$, in which $X_1$, $X_2$ and $X_3$ may each independently be a substituted or unsubstituted $C_1$-$C_{10}$ alkyl group, a substituted or unsubstituted alkoxy group, or a substituted or unsubstituted $C_6$-$C_{20}$ aryl group) and a functional group readily reactive with the polyol (e.g., isocyanate group). For example, the compound may include isocyanate alkyl trialkoxysilane. In the isocyanate alkyl trialkoxysilane, the alkyl group may be a $C_1$-$C_{10}$ alkyl group and the alkoxy group may be a $C_1$-$C_{10}$ alkoxy group. Thus the copolymer may include carbonate groups, aromatic groups, and silane groups.

The copolymer may be present in an amount of about 1 wt % to about 65 wt %, e.g., about 5 wt % to about 50 wt % or about 10 wt % to about 30 wt %, in the adhesive composition in terms of solid content. Within this range, the copolymer may have enhanced sensitivity.

The adhesive composition may include a photocurable monomer, an initiator and a crosslinking agent, in addition to the (meth)acrylate copolymer having a carbonate group and an aromatic group.

Photocurable Monomer

The photocurable monomer may include, e.g., a non-aromatic photocurable monomer containing a vinyl group or a (meth)acrylate group, without containing an aromatic group, a non-carbonate photocurable monomer containing a vinyl group or a (meth)acrylate group, without containing carbonate group, or a combination thereof.

Examples of the photocurable monomer may include vinyl monomers containing a hydroxyl group, vinyl monomers containing an alkyl group, vinyl monomers containing an alicyclic group, (meth)acrylic monomers containing a hetero-alicyclic group, vinyl monomers containing a carboxylic acid group, vinyl monomers containing a silane group, and the like. In an implementation, the photocurable monomer may include a vinyl monomer containing an alkyl group, a vinyl monomer containing an alicyclic group, a vinyl monomer containing a hydroxyl group, and a (meth)acrylic monomer containing a hetero-alicyclic group.

The photocurable monomer may be present in an amount of about 15 wt % to about 90 wt %, e.g., about 40 wt % to about 90 wt %, in the adhesive composition in terms of solid content. Within this range of the photocurable monomer, the composition may function as an adhesive.

Examples of the vinyl monomer containing an alkyl group may include (meth)acrylic esters having $C_1$-$C_{20}$ linear or branched alkyl groups. For example, the alkyl group-containing vinyl monomer may include at least one selected from the group of methyl(meth)acrylate, ethyl(meth)acrylate, propyl (meth)acrylate, n-butyl(meth)acrylate, t-butyl(meth)acrylate, iso-butyl(meth)acrylate, pentyl(meth)acrylate, hexyl (meth)acrylate, heptyl(meth)acrylate, ethylhexyl(meth) acrylate, octyl(meth)acrylate, isooctyl(meth)acrylate, nonyl (meth)acrylate, decyl(meth)acrylate, and dodecyl(meth) acrylate. The vinyl monomer containing alkyl group may be used alone or in combination of two or more thereof.

The vinyl monomer containing an alkyl group may be present in an amount of about 1 wt % to about 75 wt %, e.g., about 50 wt % to about 65 wt %, in the adhesive composition in terms of solid content.

The vinyl monomer containing a hydroxyl group may include a suitable vinyl monomer that contains a hydroxyl group and a carbon-carbon double bond. The vinyl monomer containing a hydroxyl group may contain at least one hydroxyl group. The hydroxyl group may be present at a terminal or inside of the monomer. The vinyl monomer containing a hydroxyl group may be a (meth)acrylic ester containing a hydroxyl group and a $C_1$-$C_{20}$ alkyl group. Examples of the vinyl monomer containing a hydroxyl group may include 2-hydroxyethyl(meth)acrylate, 4-hydroxybutyl (meth)acrylate, 2-hydroxypropyl(meth)acrylate, 2-hydroxybutyl(meth)acrylate, 6-hydroxyhexyl(meth)acrylate, 1,4-cyclohexane dimethanol mono(meth)acrylate, 1-chloro-2-hydroxypropyl(meth)acrylate, diethylene glycol mono (meth)acrylate, 1,6-hexanediol mono(meth)acrylate, pentaerythritol tri(meth)acrylate, dipentaerythritol penta(meth)acrylate, neopentylglycol mono(meth)acrylate, trimethylolpropane di(meth)acrylate, trimethylolethane di(meth) acrylate, 2-hydroxy-3-phenyloxypropyl(meth)acrylate, 4-hydroxycyclohexyl(meth)acrylate, 2-hydroxy-3-phenyloxy(meth)acrylate, 4-hydroxycyclopentyl(meth)acrylate, and cyclohexane dimethanol mono(meth)acrylate. The vinyl monomer containing a hydroxyl group may be used alone or in combination of two or more thereof.

The vinyl monomer containing a hydroxyl group may be present in an amount of about 1 wt % to about 10 wt %, e.g., about 2 wt % to about 9 wt %, in the adhesive composition in terms of solid content.

Examples of the vinyl monomer containing an alicyclic group may include (meth)acrylic esters containing a $C_4$-$C_{20}$ monocyclic or polycyclic alicyclic ring such as (meth)acrylic esters containing a $C_6$-$C_{20}$ monocyclic or polycyclic alicyclic ring. Examples of the vinyl monomer containing an alicyclic group may include isobornyl(meth)acrylate, cyclohexyl (meth)acrylate, cyclopentyl(meth)acrylate, and the like. The vinyl monomer containing an alicyclic group may be present in an amount of about 5 wt % to about 20 wt %, e.g., about 6 wt % to about 18 wt %, in the adhesive composition in terms of solid content. Within this range, the composition may have improved durability.

Examples of the (meth)acrylic monomer containing a hetero-alicyclic group may include (meth)acrylic monomer containing monocyclic $C_4$-$C_6$ hetero-alicyclic group containing nitrogen, oxygen or sulfur. Examples of the monomer may include (meth)acryloyl morpholine, and the like. The (meth) acrylic monomer containing a hetero-alicyclic group may be present in an amount of about 1 wt % to about 10 wt %, e.g., about 1 wt % to about 8 wt %, in the adhesive composition in terms of solid content. Within this range, the adhesive composition may exhibit improved adhesion to glass substrates.

Examples of the vinyl monomer containing a carboxylic acid group may include at least one selected from the group of β-carboxyethyl(meth)acrylate, (meth)acrylic acid, itaconic acid, maleic acid, fumaric acid, vinyl acetic acid, without being limited thereto. The vinyl monomer containing a carboxylic acid group may be present in an amount of about 0 wt % to about 10 wt %, e.g., about 1 wt % to about 10 wt %, in the adhesive composition in terms of solid content. Within this range, the adhesive composition may help improve adhesion of optical adhesives.

Initiator

The initiator may be a photoinitiator. The initiator or photoinitiator may be activated by UV light or an electron beam, thus forming free radicals in a carbon-carbon double bond of an adhesive film, causing radical reaction.

Examples of the initiator may include acetophenone compounds, benzylketal type compounds or mixtures thereof. In an implementation, examples of the acetophenone compound may include 2,2-dimethoxy-2-phenylacetophenone, 2,2'-diethoxy acetophenone, 2,2'-dibutoxy acetophenone, 2-hydroxy-2-methyl propiophenone, p-t-butyl trichloro acetophenone, p-t-butyl dichloro acetophenone, 4-chloro acetophenone, 2,2'-dichloro-4-phenoxy acetophenone, 2-methyl-1-(4-(methylthio)phenyl)-2-morpholino propane-1-on, 2-benzyl-2-dimethylamino-1-(4-morpholino phenyl)-butane-1-on, and mixtures thereof.

The initiator may be present in an amount of about 0.1 wt % to about 10 wt %, e.g., about 0.1 wt % to about 5 wt %, in the adhesive composition in terms of solid content. Within this range, the composition may be completely cured when used as an adhesive film.

Crosslinking Agent

As the crosslinking agent, a multifunctional (meth)acrylate that is curable via electromagnetic irradiation may be used.

Examples of the crosslinking agent may include bifunctional (meth)acrylates, such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, dicyclopentanyl di(meth)acrylate, caprolactone modified dicyclopentenyl di(meth)acrylate, ethylene oxide modified di(meth)acrylate, di(meth)acryloxy ethyl isocyanurate, allylated cyclohexyl di(meth)acrylate, tricyclodecane dimethanol di(meth)acrylate, dimethylol dicyclopentane di(meth)acrylate, ethylene oxide modified hexahydrophthalic acid di(meth)acrylate, neopentylglycol modified trimethylpropane di(meth)acrylate, adamantane di(meth)acrylate or 9,9-bis[4-(2-(meth) acryloyloxyethoxy)phenyl]fluorene, and the like; tri functional (meth)acrylates, such as trimethylolpropane tri(meth) acrylate, dipentaerythritol tri(meth)acrylate, propionic acid modified dipentaerythritol tri(meth)acrylate, pentaerythritol tri(meth)acrylate, propylene oxide modified trimethylolpropane tri(meth)acrylate, trifunctional urethane(meth)acrylate, tris(meth)acryloxyethyl isocyanurate, and the like; tetrafunctional (meth)acrylates, such as diglycerin tetra(meth)acrylate, pentaerythritol tetra(meth)acrylate, and the like; pentafunctional(meth)acrylates, such as dipentaerythritol penta (meth)acrylate, and the like; and hexafunctional (meth) acrylates, such as dipentaerythritol hexa(meth)acrylate, caprolactone modified dipentaerythritol hexa(meth)acrylate, and urethane hexa(meth)acrylate (e.g., reaction products of an isocyanate monomer and trimethylolpropane tri(meth) acrylate). The crosslinking agent may be used alone or in combination of two or more thereof.

In an implementation, as the crosslinking agent, multifunctional (meth)acrylates of C2-C20 multivalent alcohols may be used.

In an implementation, suitable isocyanate, epoxy, aziridine, melamine, amine, imide, carbodiimide, and amide crosslinking agents, or mixtures thereof may also be used.

The crosslinking agent may be present in an amount of about 0.01 wt % to about 10 wt %, e.g., about 0.01 wt % to about 5 wt %, in the adhesive composition in terms of solid content. Within this range, the composition may exhibit improved solvent resistance and degree of film crosslinking upon UV reaction, thereby providing improved durability.

The crosslinking agent may be present in an amount of about 0.01 parts by weight to about 50 parts by weight, e.g., about 0.01 parts by weight to about 5 parts by weight, based on 100 parts by weight of the copolymer.

The adhesive composition may further include suitable additives, e.g., silane coupling agents, curing accelerators, an ionic liquid, lithium salt, inorganic fillers, softeners, antioxidants, anti-aging agents, stabilizers, tackifier resins, reforming resins such as polyol resins, phenolic resins, acrylic resins, polyester resins, polyolefin resins, epoxy resins, epoxylated polybutadiene resins, and the like, leveling agents, antifoaming agents, plasticizers, dyes, pigments such as coloring and extender pigments, treatment agents, UV blocking agents, fluorescent whitening agents, dispersants, heat stabilizers, light stabilizers, UV absorbers, antistatic agents, lubricants, and solvents, as desired. The additives may be present in an amount of about 0.01 parts by weight to about 5 parts by weight, e.g., about 0.03 parts by weight to about 3 parts by weight or about 0.05 parts by weight to 2 parts by weight, based on 100 parts by weight of the copolymer.

The adhesive composition may be prepared as follows. The copolymer, photocurable monomer, and initiator may be mixed and partially polymerized by UV irradiation to obtain a viscous liquid. To this liquid, the crosslinking agent, initiator, and then additional additives may be added to prepare an adhesive composition.

Another embodiment provides an adhesive film having a dielectric constant variation of about 30% or less, as expressed by Equation 1, below $$\text{Dielectric constant variation (\%)} = \frac{(A-B)}{A} \times 100 \quad \text{[Equation 1]}$$

In Equation 1, A is the dielectric constant of the adhesive film measured at a frequency of $10^3$ Hz, and B is the dielectric constant of the adhesive film measured at a frequency of $10^6$ Hz.

The dielectric constant variation may be about 10% to about 30%, e.g., about 25% to about 30%. The adhesive film may exhibit lower dielectric constant variation than other adhesive films, e.g., touch films. As a result, capacitance of the adhesive film may be reduced upon touch, and signal delay may be reduced and/or prevented, thereby enhancing sensitivity.

Another embodiment provides an adhesive film having an average dielectric constant of about 3.0 or less at $10^3$ Hz to $10^6$ Hz and a resistance variation ($\Delta R$) of about 2% or less, as expressed by Equations 2 and 3, respectively.

$$\text{Average Dielectric constant} = \frac{(E_{max} + E_{min})}{2} \quad \text{[Equation 2]}$$

In Equation 2, $E_{max}$ is a maximum dielectric constant of the adhesive film measured at a frequency of $10^3$ Hz to $10^6$ Hz, and is a minimum dielectric constant of the adhesive film measured at a frequency of $10^3$ Hz to $10^6$ Hz.

$$\Delta R = \frac{P_2 - P_1}{P_1} \times 100 \quad \text{[Equation 3]}$$

In Equation 3, $P_1$ is an initial resistance (unit:$\Omega$) measured on a sample with electrodes formed at both ends of the adhesive film, and $P_2$ is resistance (unit:$\Omega$) of the sample after storage at 60° C./90% RH for 240 hours.

In an implementation, the adhesive film may have an average dielectric constant of about 2.0 to 3.0 and a resistance variation of about 1.0% to about 2.0%.

When the average dielectric constant of the adhesive film is about 3.0 or less and the resistance variation thereof is about 2.0% or less, capacitance of the adhesive film may be reduced upon touch, and signal delay may be reduced and/or prevented, thereby enhancing sensitivity.

The adhesive film may have an index of refraction of about 1.48 or more, e.g., from about 1.48 to about 1.50. The adhesive film may have an index of refraction very similar to that of a transparent window glass (an index of refraction: 1.50), thus improving outdoor readability.

The adhesive film may have an acid value of about 0 mg KOH/g, which helps prevent variation in resistance upon attaching the adhesive film to a transparent conductive film.

The adhesive film may be prepared from the adhesive composition.

The adhesive film according to an embodiment may be formed by curing the adhesive composition. For example, the adhesive composition may be coated to a release film (e.g., polyester or polyethylene terephthalate film) and UV-cured. In an implementation, UV curing may be carried out at about 50 mW or less for 20 seconds to 240 seconds. Curing may be carried out in an anoxic environment.

Although there is no particular restriction as to coating thickness, the adhesive composition may be coated to thickness from about 50 µm to about 2 mm, e.g., from about 150 µm to about 1.5 mm.

Although the thickness of the adhesive film (thickness except release film thickness) is not particularly limited, the adhesive film may have a thickness of about 10 µm to about 1 mm, e.g., about 50 µm to about 1.5 mm.

Another embodiment provides an optical member.

The optical member may include an optical film, and the adhesive film attached to at least one side of the optical film. The optical film may include, e.g., a polarizing plate, a color filter, a retardation film, an oval polarizing film, a reflective film, an anti-reflection film, a compensation film, a brightness enhancement film, an alignment film, a light diffusion film, an anti-glass scattering film, a surface protective film, a plastic LCD substrate, a glass substrate such as a window glass, a transparent conductive film such as an ITO film, and the like.

For example, a touchpad may be attached to a window or optical film using the adhesive film, thereby forming a touch panel. Alternatively, the adhesive film may be applied to a general polarizing film by a suitable method. In an implementation, the optical member may include a capacitive touch panel and a capacitive-type mobile phone.

FIG. 1 illustrates a sectional view of an optical member according to an embodiment. Referring to FIG. 1, the optical member may include an optical film (200); and an adhesive film (110) on the optical film (200).

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

PREPARATIVE EXAMPLE 1

(Meth)acrylate Copolymer 1 Containing Carbonate Groups and Aromatic Groups

To a four-neck 2 L flask, 90 g of a carbonate polyol containing an aromatic group was added and heated to 60° C. Then, 0.5 g of dibutyltin dilaurate diluted in toluene in a ratio of 10% was added to the flask. The resultant was cooled to 50° C., and then 6 g of 2-methacryloylchloride and 6 g of 2-methacryloyloxyethyl isocyanate (MOI) were added thereto. The resultant was maintained at 50° C. for seven hours. After identifying through IR that NCO groups of MOI were not observed, the resultant was cooled to 40° C. A (meth)acrylate polymer containing carbonate groups and aromatic groups represented by Formula 1A, wherein a was 4, was prepared.

PREPARATIVE EXAMPLE 2

(Meth)acrylate Copolymer 2 Containing Carbonate Groups and Aromatic Groups

To a four-neck 2 L flask, 90 g of a carbonate polyol containing an aromatic group was added and heated to 60° C. Then, 0.5 g of dibutyltin dilaurate diluted in toluene in a ratio of 10% was added to the flask. 11 g of 3-isocyanatepropyl triethoxysilane was added and the temperature was maintained at 60° C. for 3 hours. After identifying through IR that NCO groups of MOI were not observed, the resultant was cooled to 50° C., and then 6 g of 2-methacryloyloxyethyl isocyanate (MOI) was added. The resultant was maintained at 50° C. for 7 hours. After identifying through IR that NCO groups of MOI were not observed, the resultant was cooled to 40° C. A (meth)acrylate copolymer containing carbonate groups and aromatic groups and a silane group represented by Formula 1B, wherein a was 4, was prepared:

[Formula 1B]

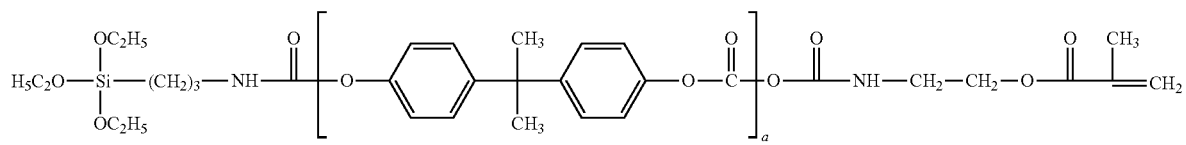

Details of components used in Examples and Comparative Examples are as follows:

(A) (Meth)acrylate copolymer containing carbonate groups and aromatic groups: (A1) Copolymer prepared in Preparative Example 1, (A2) Copolymer prepared in

PREPARATIVE EXAMPLE 2

(B) Photocurable monomer: (B1) ethylhexylacrylate (EHA), (B2) isobornyl acrylate (IBOA), (B3) 2-hydroxyethyl acrylate (HEA), (B4) acryloyl morpholine (ACMO)

(C) Initiator: Irgacure M651 (2,2-dimethoxy-2-phenylacetophenone) (Ciba Japan K.A.)

(D) Crosslinking agent: 1,6-hexanediol diacrylate (HDDA)

Examples and Comparative Examples

Viscous liquids were obtained by mixing (A), (B), in amounts as listed in Table 1, below, and 0.04 parts by weight of (C) initiator in a glass container, followed by replacing dissolved oxygen with nitrogen gas, and polymerizing the

[Formula 1A]

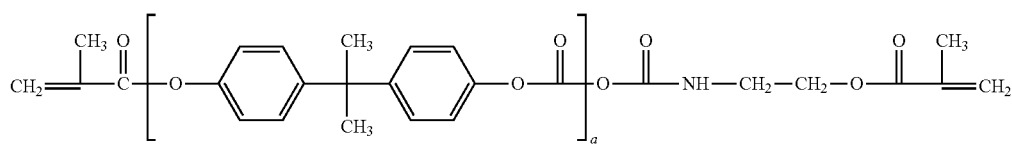

mixture by irradiation using a low pressure lamp for a few minutes. To the obtained composition, 0.26 parts by weight of the (C) initiator and the (D) crosslinking agent in amounts as listed in Table 1 were added and thoroughly mixed to prepare an adhesive composition.

The prepared adhesive composition was applied to a 50 μm thick polyester release film, followed by performing release treatment at a layer thickness of 100 μm. In order to remove oxygen, which negatively affects polymerization, the release film was covered, and irradiated from two surfaces using a low-pressure lamp (Sylvania BL Lamp) for about 3 minutes to obtain a transparent adhesive sheet.

TABLE 1

|     |      | Example 1 | Example 2 | Example 3 | Example 4 | Comparative Example 1 |
|-----|------|-----------|-----------|-----------|-----------|-----------------------|
| (A) | (A1) | 15        | —         | —         | —         | —                     |
|     | (A2) | —         | 15        | 15        | 15        | —                     |
| (B) | (B1) | 59        | 59        | 57        | 57.2      | 74                    |
|     | (B2) | 11.2      | 11.2      | 11.2      | 13        | 11.2                  |
|     | (B3) | 8.3       | 8.3       | 8.3       | 8.3       | 8.3                   |
|     | (B4) | 6         | 6         | 8         | 6         | 6                     |
| (C) |      | 0.3       | 0.3       | 0.3       | 0.3       | 0.3                   |
| (D) |      | 0.2       | 0.2       | 0.2       | 0.2       | 0.2                   |
| Curing method | | UV curing | Un curing | UV curing | UV curing | UV curing |
| Total amount  | | 100 | 100 | 100 | 100 | 100 |

The prepared adhesive sheets were evaluated as to the following physical properties. Results are shown in Table 2, below.

(1) Resistance variation: Each of the adhesive sheets prepared in the examples and the comparative examples were attached to ITO and PET and electrodes were formed on opposite sides thereof using a silver paste, thereby preparing a sample. Initial resistance (P1, unit: Ω) of the sample was measured. The sample was left at 60° C./90% RH for 240 hours, followed by evaluation of resistance (P2, unit: Ω). Here, resistance was measured using a portable test instrument for measuring resistance, voltage, and current (Checkman, Tae Kwang Electronics Co.). To calculate resistance variation (ΔR), the obtained resistances under the above-mentioned conditions were substituted into Equation 3.

(2) Durability: A PC film/ITO film/glass and a PET film were bonded and left at 60° C./90% RH for 500 hours, followed by observation with the naked eye to identify whether separation, peeling, or bubbles occurred on an adherend. Evaluation was performed as follows.

O: Good (no bubbles and no peeling)

X: Poor (large amount of bubbles or severe peeling)

(3) Optical properties: An adhesive composition was coated on a release PET film, followed by curing at 3000 mJ/cm² to prepare a 200 μm thick adhesive film. After removing the release film, transmittance and yellow index of the 200 μm thick adhesive film were measured using a Lambda 950 (manufactured by Perkin Elmer) in the range of wavelength 400~800 nm.

After removing the release film, the 200 μm thick adhesive film was evaluated using a hazemeter (NHD-200W). The adhesive film was subjected to aging for 30 minutes prior to the measurement, and the sample had a size of 5 cm×5 cm×200 μm (width×length×thickness). After opening the cover of the hazemeter, the sample was set in the hazemeter with sample texture directed in the mechanical direction (MD), and the optical properties of the sample were measured 3 times.

(4) Dielectric constant, dielectric constant variation and average dielectric constant: Dielectric constant of an adhesive film (width×length×thickness=4 cm×6 cm×100 μm) was measured at $10^3$ Hz to $10^6$ Hz using an E5515E 8960 (Agilent). Dielectric constant variation and average dielectric constant were measured in accordance with Equations 1 and 2.

(5) Index of refraction: Index of refraction was measured according to ASTM D1218. An adhesive composition was coated onto a PET release film and cured at 3,000 mJ/cm² to prepare a 175 μm thick adhesive film. After removing the release film, an index of refraction of the 200 μm adhesive film was measured using an ABBES refractometer (Bellingham/Stanley Ltd.).

TABLE 2

|  |  | Example 1 | Example 2 | Example 3 | Example 4 | Comparative Example 1 |
|---|---|---|---|---|---|---|
| Resistance Variation (%) | | 1.5 | 1.5 | 1.6 | 1.6 | 1.5 |
| Durability | | O | O | O | O | x |
| Optical properties | Transmittance (%) | 93.1 | 93.2 | 93.4 | 93.4 | 89.1 |
|  | YI | 0.18 | 0.19 | 0.17 | 0.18 | 0.19 |
|  | Haze (%) | 0.3 | 0.3 | 0.4 | 0.3 | 0.4 |
| Dielectric constant | At $10^3$ Hz | 3.50 | 3.42 | 3.32 | 3.43 | 5.20 |
|  | At $10^6$ Hz | 2.48 | 2.46 | 2.42 | 2.43 | 3.52 |
| Dielectric constant variation (%) | | 29.10 | 28.07 | 27.10 | 29.15 | 32.30 |
| Average Dielectric constant | | 2.99 | 2.94 | 2.87 | 2.93 | 4.36 |
| Index of refraction | | 1.49 | 1.49 | 1.49 | 1.50 | 1.47 |

As may be seen in Table 2, the adhesive films according to the examples exhibited low dielectric constant variation. However, the adhesive films according to the examples had high indexes of refraction. Thus, the adhesive films did not suffer from touch malfunction and could have improved outdoor readability. On the other hand, the adhesive films according to Comparative Example 1, in which the copolymer of the embodiments was not used, had high dielectric constant variation and a low index of refraction, thereby failing to achieve the advantageous effects of the examples.

By way of summation and review, in capacitive touch panels employing some types of adhesive films, the capacitance may be varied due to dielectric constant variation of the adhesive film, thereby causing switch signal malfunction. For example, such malfunction may be more severe when dielectric constant variation of the adhesive film is large. In addition, malfunctions may occur when the switch signal is greatly changed due to external noise in a display of the touch panel.

In this context, an acrylic polymer compound may be copolymerized from monomer components including (a) a (meth)acrylic ester monomer containing a $C_1$-$C_{12}$ hydrocarbon group, (b) a (meth)acrylic ester monomer containing a hydroxyl group, (c) a monomer having an amide group and (d) a vinyl ester monomer, and may be employed in an resin-based adhesive composition for a touch panel having an acid value of 0.1 mg KOH/g or less and a dielectric constant of 3 to 6.

The embodiments provide an adhesive film, which can be used to attach transparent members to each other, inhibit variation in capacitance, prevent malfunction due to touching, and improve outdoor readability in a capacitive touch panel.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

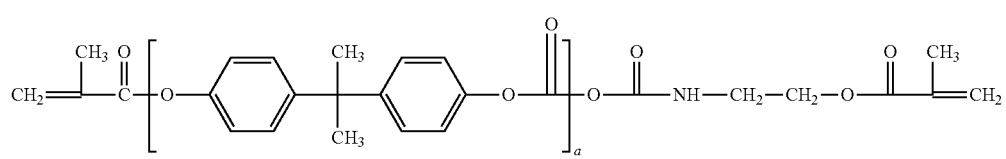

-continued
[Formula 1B]
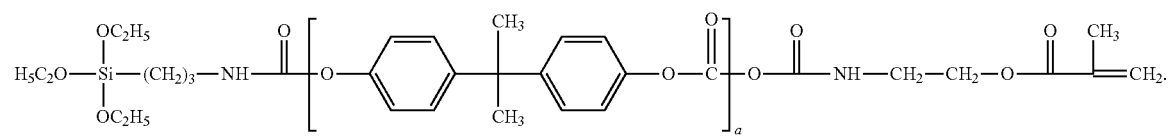

What is claimed is:

1. An adhesive film having an index of refraction of about 1.48 or more and a dielectric constant variation of about 30% or less, as expressed by Equation 1:

$$\text{Dielectric constant variation (\%)} = \frac{(A-B)}{A} \times 100, \quad \text{[Equation 1]}$$

wherein A is the dielectric constant of the adhesive film measured at a frequency of $10^3$ Hz, and B is the dielectric constant of the adhesive film measured at a frequency of $10^6$ Hz, and wherein the adhesive film includes a (meth)acrylate copolymer having carbonate groups and aromatic groups.

2. The adhesive film as claimed in claim 1, wherein the adhesive film further includes a photocurable monomer, an initiator, and a crosslinking agent.

3. The adhesive film as claimed in claim 2, wherein the adhesive film includes about 1 wt % to about 65 wt % of the (meth)acrylate copolymer, about 15 wt % to about 90 wt % of the photocurable monomer, about 0.1 wt % to about 10 wt % of the initiator, and about 0.01 wt % to about 10 wt % of the crosslinking agent, all wt % being in terms of solid content of the adhesive film.

4. The adhesive film as claimed in claim 1, wherein the (meth)acrylate copolymer is represented by Formula 1:

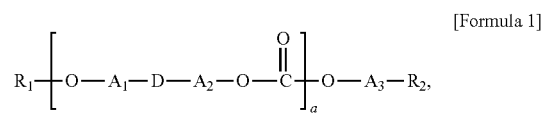

wherein $R_1$ is hydrogen, a substituted or unsubstituted $C_1$-$C_3$ alkyl group, or a group represented by Formula 2 or 3:

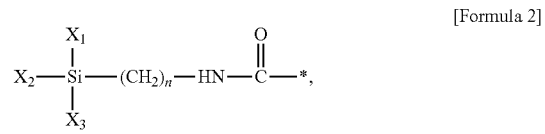

wherein * represents a linking group for —O— in Formula 1, $X_1$, $X_2$ and $X_3$ are the same or different and each independently are a substituted or unsubstituted $C_1$-$C_{10}$ alkyl group, a substituted or unsubstituted $C_1$-$C_{10}$ alkoxy group, or a substituted or unsubstituted $C_6$-$C_{20}$ aryl group, and n is an integer from 1 to 10,

wherein * represents a linking group for —O— in Formula 1, and $R_3$ is hydrogen or a substituted or unsubstituted $C_1$-$C_3$ alkyl group;

$A_1$ and $A_2$ are the same or different, and each independently are a substituted or unsubstituted $C_6$-$C_{20}$ aromatic hydrocarbon group;

D is a single bond, or a substituted or unsubstituted $C_1$-$C_{10}$ alkylene group;

$A_3$ is a single bond, —CO—$(CH_2)_m$— or —CONH—$(CH_2)_p$—, wherein m is an integer from 1 to 10 and p is an integer from 1 to 10;

$R_2$ is a group represented by Formula 4:

wherein * represents a linking group for $A_3$, and $R_4$ is hydrogen or a substituted or unsubstituted $C_1$-$C_3$ alkyl group; and a is an integer from 1 to 250.

5. An adhesive film having an index of refraction of about 1.48 or more and an average dielectric constant of about 3.0 or less at a frequency of $10^3$ Hz to $10^6$ Hz and a resistance variation (ΔR) of about 2% or less, as expressed by Equations 2 and 3, respectively:

$$\text{Average Dielectric constant} = \frac{(E_{max} + E_{min})}{2}, \quad \text{[Equation 2]}$$

wherein $E_{max}$ is a maximum dielectric constant of the adhesive film measured at a frequency of $10^3$ Hz to $10^6$ Hz, and $E_{min}$ is a minimum dielectric constant of the adhesive film measured at a frequency of $10^3$ Hz to $10^6$ Hz, $$\Delta R = \frac{P_2 - P_1}{P_1} \times 100, \quad \text{[Equation 3]}$$

wherein $P_1$ is an initial resistance (unit:Ω) measured on a sample with electrodes formed at both ends of the adhesive film, and $P_2$ is resistance (unit:Ω) of the sample after storage at 60° C/90%RH for 240 hours, and wherein the adhesive film includes a (meth)acrylate copolymer having carbonate groups and aromatic groups.

6. The adhesive film as claimed in claim 5, wherein the adhesive film further includes a photocurable monomer, an initiator, and a crosslinking agent.

7. The adhesive film as claimed in claim 6, wherein the adhesive film includes about 1 wt % to about 65 wt % of the (meth)acrylate copolymer, about 15 wt % to about 90 wt % of the photocurable monomer, about 0.1 wt % to about 10 wt % of the initiator, and about 0.01 wt % to about 10 wt % of the crosslinking agent, all wt % being in terms of solid content of the adhesive film.

8. The adhesive film as claimed in claim 5, wherein the (meth)acrylate copolymer is represented by Formula 1:

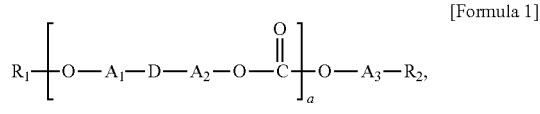
[Formula 1]

wherein $R_1$ is hydrogen, a substituted or unsubstituted $C_1$-$C_3$ alkyl group, or a group represented by Formula 2 or 3:

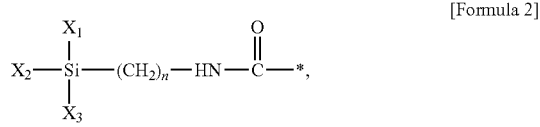
[Formula 2]

wherein * represents a linking group for —O— in Formula 1, $X_1$, $X_2$ and $X_3$ are the same or different and each independently are a substituted or unsubstituted $C_1$-$C_{10}$ alkyl group, a substituted or unsubstituted $C_1$-$C_{10}$ alkoxy group, or a substituted or unsubstituted $C_6$-$C_{20}$ aryl group, and n is an integer from 1 to 10,

[Formula 3]

wherein * represents a linking group for —O— in Formula 1, and $R_3$ is hydrogen or a substituted or unsubstituted $C_1$-$C_3$ alkyl group;

$A_1$ and $A_2$ are the same or different, and each independently are a substituted or unsubstituted $C_6$-$C_{20}$ aromatic hydrocarbon group;

D is a single bond, or a substituted or unsubstituted $C_1$-$C_{10}$ alkylene group;

$A_3$ is a single bond, —CO—$(CH_2)_m$— or —CONH—$(CH_2)_p$—, wherein m is an integer from 1 to 10 and p is an integer from 1 to 10;

$R_2$ is a group represented by Formula 4:

[Formula 4]

wherein * represents a linking group for $A_3$, and $R_4$ is hydrogen or a substituted or unsubstituted $C_1$-$C_3$ alkyl group; and a is an integer from 1 to 250.

9. An adhesive composition comprising a (meth)acrylate copolymer, wherein the (meth)acrylate copolymer is represented by Formula 1:

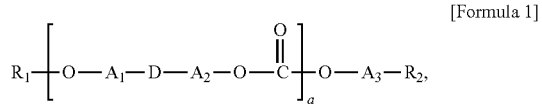
[Formula 1]

wherein $R_1$ is hydrogen, a substituted or unsubstituted $C_1$-$C_3$ alkyl group, or a group represented by Formula 2 or 3:

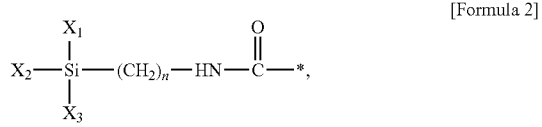
[Formula 2]

wherein * represents a linking group for —O— in Formula 1, $X_1$, $X_2$ and $X_3$ are the same or different and each independently are a substituted or unsubstituted $C_1$-$C_{10}$ alkyl group, a substituted or unsubstituted $C_1$-$C_{10}$ alkoxy group, a substituted or unsubstituted $C_6$-$C_{20}$ aryl group, and n is an integer from 1 to 10,

[Formula 3]

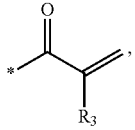

wherein * represents a linking group for —O— in Formula 1, and $R_3$ is hydrogen or a substituted or unsubstituted $C_1$-$C_3$ alkyl group;

$A_1$ and $A_2$ are the same or different, and each independently are a substituted or unsubstituted $C_6$-$C_{20}$ aromatic hydrocarbon group;

D is a single bond, or a substituted or unsubstituted $C_1$-$C_{10}$ alkylene group;

$A_3$ is a single bond, —CO—$(CH_2)_m$— or —CONH—$(CH_2)_p$—, wherein m is an integer from 1 to 10 and p is an integer from 1 to 10;

$R_2$ is a group represented by Formula 4:

[Formula 4]

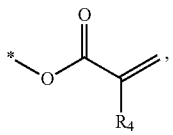

wherein * represents a linking group for $A_3$, and $R_4$ is hydrogen or a substituted or unsubstituted $C_1$-$C_3$ alkyl group; and a is an integer from 1 to 250.

10. The adhesive composition as claimed in claim 9, wherein the (meth)acrylate copolymer has a dielectric constant of about 3.0 or less at a frequency of $10^3$ Hz to $10^6$ Hz and an index of refraction of about 1.50 to about 1.60.

11. The adhesive composition as claimed in claim 9, wherein the (meth)acrylate copolymer has a weight average molecular weight of about 5,000 g/mol to about 100,000 g/mol.

12. The adhesive composition as claimed in claim 9, further comprising a photocurable monomer, an initiator, and a crosslinking agent.

13. The adhesive composition as claimed in claim 12, wherein the composition includes about 1 wt % to about 65 wt % of the (meth)acrylate copolymer, about 15 wt % to about 90 wt % of the photocurable monomer, about 0.1 wt % to about 10 wt % of the initiator, and about 0.01 wt % to about 10 wt % of the crosslinking agent, all wt % being in terms of solid content of the composition.

14. The adhesive composition as claimed in claim 12, wherein the photocurable monomer includes a vinyl monomer-containing alkyl group, a vinyl monomer-containing alicyclic group, a vinyl monomer-containing hydroxyl group, and a (meth)acrylic monomer-containing hetero-alicyclic group.

15. The adhesive composition as claimed in claim 14, wherein the vinyl monomer-containing alkyl group is present in an amount of about 1 wt % to about 75 wt %, the vinyl monomer-containing hydroxyl group is present in an amount of about 1 wt % to about 10 wt %, the vinyl monomer-containing alicyclic group is present in an amount of about 5 wt % to about 20 wt %, and the (meth)acrylic monomer-containing hetero-alicyclic group is present in an amount of about 1 wt % to about 10 wt %, in the adhesive composition.

16. The adhesive composition as claimed in claim 12, further comprising: a silane coupling agent.

17. The adhesive composition as claimed in claim 12, further comprising a curing accelerator, an ionic liquid, a lithium salt, an inorganic filler, a softener, an antioxidant, an anti-aging agent, a stabilizer, a tackifier resin, a reforming resin, a leveling agent, an antifoaming agent, a plasticizer, a dye, a pigment, treatment agents, a UV blocking agent, a fluorescent whitening agent, a dispersant, a heat stabilizer, a light stabilizer, a UV absorber, an anti-static agents, a lubricant, or a solvent.

18. An optical member comprising the adhesive film as claimed in claim 1.

19. An optical member comprising the adhesive film as claimed in claim 5.

20. The adhesive film as claimed in claim 5, wherein:
the adhesive film includes the (meth)acrylate copolymer having carbonate groups and aromatic groups, a photocurable monomer, an initiator, and a crosslinking agent, and
the (meth)acrylate copolymer is a compound represented by one of the following Formula 1A or Formula 1B, in which a is 4:

[Formula 1A]